United States Patent [19]
Helms et al.

[11] Patent Number: 5,959,015
[45] Date of Patent: Sep. 28, 1999

[54] CONDUCTIVE MODIFICATION OF PAINTABLE MOLD-IN COLOR CAPABLE, THERMOPLASTIC OLEFIN FORMULATION

[75] Inventors: Jeffrey Hampton Helms, Plymouth; Rose Ann Ryntz, Clinton Township, both of Mich.; Edmund Joseph Blais, Windsor, Canada

[73] Assignee: Ford Global Technologies, Inc., Dearborn, Mich.

[21] Appl. No.: 09/103,514

[22] Filed: Jun. 23, 1998

[51] Int. Cl.$^6$ .............................. C08K 3/10; C08K 3/16; C08L 51/06

[52] U.S. Cl. ................... 524/394; 524/401; 524/414; 524/418; 524/428; 524/504; 524/582; 524/585; 524/586; 525/74; 525/77; 525/76; 525/80

[58] Field of Search ................... 524/394, 401, 524/428, 418, 414, 127, 147, 148, 149, 167, 504, 582, 585, 586; 525/74, 77, 76, 80

[56] References Cited

U.S. PATENT DOCUMENTS

| | | |
|---|---|---|
| 4,105,709 | 8/1978 | Iwami et al. |
| 4,371,476 | 2/1983 | Newkirk et al. |
| 4,508,867 | 4/1985 | Sato. |
| 4,619,962 | 10/1986 | Sato. |
| 4,687,801 | 8/1987 | Mitani et al. |
| 4,935,272 | 6/1990 | Leboeuf. |
| 5,337,184 | 8/1994 | Helms et al. |
| 5,599,871 | 2/1997 | Park. |
| 5,721,315 | 2/1998 | Evans et al. ................. 525/74 |
| 5,783,630 | 7/1998 | Evans et al. ................. 525/74 |
| 5,847,051 | 12/1998 | Hwo et al. ................... 525/98 |

OTHER PUBLICATIONS

Polymer Electrolyte Reviews–1, Eds. J. R. MacCallum and C. A. Vincent, Elsevier Applied Science, London and New York, 1987, pp. 1–22.

Electroresponsive Molecular and Polymeric Systems, Ed. Terje A. Skotheim, Marcel Dekker, Inc., New York and Basel, 1988, pp. 41–95.

Solid Polymer Electrolytes, Fundamentals and Technological Applications, Ed. Fiona M. Gray, VCH Publishers, Inc., New York, 1991, pp. 95–122.

*Primary Examiner*—Mark Warzel
*Attorney, Agent, or Firm*—Lorraine S. Melotik

[57] ABSTRACT

A electrical conductivity modified thermoplastic olefin (TPO) polymer blend with improved electrostatic painting efficiency, the blend comprising a substantially uniform mixture of: I. polymeric material being the reaction product of: (a) polypropylene, (b) maleated polypropylene, (c) elastomer, and (d) amine-terminated polyether being a linear or branched polymer of oxypropyleneamine or oxyethyleneamine repeating units having 40–100 such units, and II. alkali metal salt, the alkali metal salt being included in the thermoplastic polymer blend in an amount which provides the blend with a conductivity of at least $10^{-12}$ S/cm at 25° C.

8 Claims, No Drawings

CONDUCTIVE MODIFICATION OF PAINTABLE MOLD-IN COLOR CAPABLE, THERMOPLASTIC OLEFIN FORMULATION

FIELD OF THE INVENTION

The invention is directed to a modified thermoplastic olefin blend (TPO) including an amine-terminated polyether and maleated polypropylene whose electrical conductivity is improved by adding thereto alkali metal ions.

BACKGROUND OF THE INVENTION

Electrostatic painting of substrates is desirable because it can reduce paint waste and solvent emissions as compared to non-electrostatic painting techniques. Electrostatic painting techniques, however, require the substrate to be electrically conducting. If the material is itself not electrically conducting, to provide increased paint transfer efficiency during electrostatic painting, the material is required to be made conducting. This can be done by using an applied prepcoat which is electrically conducting. In the past, injection molded articles made from electrically insulating thermoplastic materials like XENOY™ or thermoplastic olefin (TPO), used such an applied conducting primer to improve electrostatic painting. Applying such prepcoats increases manufacturing complexity.

The invention of U.S. Pat. No. 5,484,838 improves on such surface conductivity imparting methods by disclosing a thermoplastic polymer blend which had increased electrical conductivity throughout the bulk of the substrate bulk material. This bulk conductivity was provided by the addition of electrically conductive carbon black to the polymer blend. In particular, the blend comprises at least a crystalline polymer and an amorphous or semi-crystalline polymer wherein at least a portion of the carbon black is dispersed within the crystalline polymer. Such electrically modified bulk material, particularly TPO, is used in the automotive industry in a variety of molded articles including bumper fascias, instrument panels, and mirror housings painted by electrostatic methods. Since carbon is black, it imparts a black color to the final product. An adhesion promoting layer is generally applied to this carbon black modified TPO before application of a basecoat and clearcoat in order to improve adhesion to the TPO.

It is an object of this invention to provide a plastic material useful in automotive applications which can be partially painted electrostatically while being colored other than black. That is, to be able to be colored to match or compliment the color of an automotive vehicle. It is another object of the present invention to provide a plastic material which may be painted without an applied primer coat to improve adhesion between of the paint and the TPO substrate. The present invention meets these objects as will be explained in detail.

SUMMARY OF THE INVENTION

The invention is a modified thermoplastic olefin (TPO) polymer blend with improved electrical conductivity, particularly useful to improve electrostatic painting efficiency of the plastic material. The modified TPO plastic blend comprises a substantially uniform mixture of polymeric material and alkali metal salts. The alkali metal salt is included in the polymer blend in an amount which provides said blend with a conductivity of at least $10^{-2}$ S/cm at 25° C.

The polymeric material is the reaction product of components: (a) polypropylene, (b) maleated polypropylene, (c) elastomer, and (d) amine-terminated polyether which is a linear or branched polymer of oxypropyleneamine or oxyethyleneamine repeating units having 10–100 such units. The polypropylene has a number average molecular weight of 30,000–120,000, 40–50% crystallinity, and melt flow rate of 1–70 dg/min. The maleated polypropylene has a number average molecular weight of 10,000–60,000. The elastomer has a number average molecular weight of 23,000–50,500, 10–50% crystallinity, and melt flow rate of 1.2–9.0 dg/min.

In forming the blend, the alkali metal salt is preferably, but not necessarily, mixed with the amine-terminated polyether prior to its reaction with the other polymer components. The amine-terminated polyether can be reacted with maleated polypropylene prior to its reaction with the other polymer components.

According to another embodiment of the invention, it is the method of making the electrically conductive polymer blend disclosed above.

DETAILED DESCRIPTION OF THE PREFERRED EMBODIMENTS

As disclosed above, the invention is a conductively modified thermoplastic olefin polymer (TPO) blend which has improved electrostatic painting efficiency. This modified blend is able to be manufactured, e.g., by extrusion, and formed into components which may be painted as desired. Advantageously, since the blend has been made conductive through the addition of alkali metal salts, it can be painted using commercially desirable electrostatic painting techniques. As disclosed above, electrostatic painting techniques allow more environmentally and commercially efficient painting of components. In addition, since the alkali metal salts are colorless, as compared to the black color of carbon black, their addition to the TPO blend does not impart color. Hence, not all of the component needs to be painted, rather use of the present invention material allows for the part to be molded-in-color and only part of the component to be painted. This is because it can be made various colors since alkali metals do not impart color, not just black as when carbon is used. These colors can be such to match or compliment the item with which it is used. For example, if used in automotive vehicle applications like bumper fascias, it can be a color associated with the vehicle, and does not need to be black. It is apparent that molded-in-color parts provide enhanced design opportunities in automotive applications.

Further we have found, that conductive plastics of the present invention provide enhanced adhesion to paint thereto, obviating the need for primer coats generally provided on TPO to help adhere the decorative topcoats applied to the TPO plastic. The commercial manufacturing advantage in terms or cost and time is apparent.

As disclosed above, the modified plastic of the present invention comprises a substantially uniform mixture of a (I)

polymeric material which forms the plastic aspect of the blend and (II) alkali metal salt which imparts electrical conductivity thereto. In particular, the polymeric material is the reaction product of these four components: (a) polypropylene, (b) maleated polypropylene, (c) elastomer, and d) amine-terminated polyether (known in the art field as Jeffamine) which is a linear or branched polymer of oxypropyleneamine or oxyethyleneamine repeating units. Polyoxyethyleneamine has the chemical formula: $NH_2CH(CH_3)CH_2—(OCH_2CH_2)_n—NH_2$ and polyoxypropyleneamine has the chemical formula: $NH_2CH(CH_3)CH_2—(OCH_2CH(CH_3))_n—NH_2$. The amine-terminated polyether has 10–100, preferably 20–60 repeating units (i.e., n=10–100).

In forming the blend, the four above discussed polymers will be reacted. One reaction generally expected to take place during compounding is between a slight excess of the amine-terminated polyether and the maleated polypropylene, i.e., when the amine-terminated polyether is grafted to the polypropylene. That is, it is expected that the amine end-group of one mole of the amine-terminated polyether reacts with the maleic anhydride functionality of 1.01 to 1.05 mole of the maleated polypropylene, however these proportions are not critical. As is known in the art, a maleated polypropylene and that useful in this invention has the general chemical formula: $CH_3CH_2CH—(CH(CH_3)CH_2C_4H_3O_3)_n—$ with a number average molecular weight of 10,000 to 60,000. Generally, optimal maleated polypropylene for the present invention also have a viscosity of 35–250 cps at 160° C., a density of 0.88–0.93 g/cm$^3$, and an acid number of 10–45.

Generally formation of the grafted amine-terminated polyether would take place during mixing of the components in an extruder, but alternatively can be done off-line if it is desired to first separately graft the amine-terminated polyether to the maleated polypropylene. If the latter is carried out, i.e., off line, this grafted amine-terminated polyether would then be compounded with the last two components, the polypropylene and the elastomer, during processing as by extrusion.

Polypropylenes useful in the present invention have a number average (Mn) molecular weight of 30,000–120,000, more preferably being 50,000–80,000. Their crystallinity is 40–50% and melt flow rate is 1–70 dg/minute. Examples of polypropylenes useful in the present invention are Exxon Chemical Company Escorene 1042 with a density of 0.905 g/cm$^3$, melt flow rate of 1.9 dg/min, Mn of approximately 67,070, Mw/Mn equal to 3.51, and flexural modulus equal to 1240 MPa and Escorene 1105 with a density of 0.906 g/cm$^3$, melt flow rate equal to 34 dg/min, Mn of approximately 48,021, Mw/Mn equal to 2.58, and a flexural modulus of 1170 MPa. Still others will be apparent to those skilled in the art in view of the present disclosure.

The fourth polymeric component used to form the blend is an elastomer having crystallitity of 10–50%, melt flow rates of 1.2 to 9.0 dg/min, and number average molecular weights of 23,000 to 50,500. Such elastomers may include ethylene propene, ethylene butene, ethylene hexene or ethylene octene, to name but a few. Still others will be apparent to those skilled in the art in view of the teachings herein. Exemplary of such materials are Exxon Chemical Company Exact 4033, 3125, and/or 3022 (ethylene-butylene copolymers) with a Mw/Mn of 1.95 to 2.65.

Generally in forming the present invention polymer blend, the materials are utilized in the following amounts by weight: 55–75 parts polypropylene, 8–15 parts maleated polypropylene, 2–10 parts amine terminated polyether, and 10–25 parts elastomer. More preferred are blends with 60–70 parts polypropylene, 10–12 parts maleated polypropylene, 4–6 parts amine terminated polyether particularly with ethylene oxide repeat units, and 10–22 parts elastomer, particularly being ethylene-butylene copolymer elastomer.

In applications with stringent low temperature impact requirements, the elastomer level will typically represent 20–25 percent of the composition. Polypropylene content is largely dependent on the required modulus of the resulting blend with higher polypropylene content in stiffer materials.

The blend according to the present invention as an electrical conductivity of at least $10^{-12}$ S/cm at 25° C. In order to impart this electrical conductivity, alkali metal salts are incorporated in the blend. The alkali metal ions that can be used include, but are not limited to, lithium, sodium, and potassium. The salt may be of chlorides, e.g., lithium chloride, bromides, thiocyanides, hexafluorophosphates, acetates, trifluoromethane sulfonates, and mixtures of any of them. It is believed that the polyethylene oxide (EO) and polypropylene oxide (PO) units of the of the amine-terminated polyether acts to solvate the alkali metal salts therefore providing ionic conductivity to the injection molded paintable TPO parts while maintaining substrate paintability. However, neither the understanding nor validity of this theory is necessary for practice of this invention.

The salt is added to the polymer blend or can be added first to the graft of the maleated polypropylene and amine-terminated polyether followed by the addition of this adduct with the remaining polymer components. The amount of salt added is defined in terms of the molar ratios of the ethylene oxide or propylene oxide repeat units to alkali metal cation. This ratio is desirably in the range of 5/1–30/1. For instance, for an ethylene oxide amine-terminated polyether, the number of ethylene oxide repeat units is approximately 24. Therefore 1 mole of the amine-terminated polyether represents 24 moles of the ethylene oxide repeat unit. To make a 10/1 ratio with alkali metal salt, 2.4 moles of alkali metal salt is required.

Prior to the present invention, it is believed by the present inventors that parts manufactured from TPO required the application of an adhesion promoting layer prior to application of the basecoat and clearcoat for good adhesion. And in the absence of an electrically conducting adhesion promoter and/or primer, the electrostatic painting efficiency for basecoat and clearcoat decreases by 50% because dissipation of electrical charge to ground cannot be efficiently accomplished. In order to maintain high painting efficiencies and realization of the cost savings associated with removal of the adhesion promoter and/or primer, conductive modification of the paintable TPO resin is necessary. Initial attempts to conductive modification of paintable TPO using the high structure conductive carbon black approach has shown a significant interaction between the carbon black and the amine. This interaction both increases the necessary carbon level for acceptable electrostatic dissipation and decreases the adhesion of the basecoat to the substrate.

Presumably, this interaction is associated with the polarity of the amine and the high surface area of the conductive carbon black.

The alkali metal is included in the polymer blend in an amount which provides said blend with a conductivity of at least $10^{-12}$ S/cm at 25° C. In forming the blend, the alkali metal salt is preferably be mixed with the amine-terminated polyether prior to its reaction with the other polymer components. As disclosed above, the amine-terminated polyether can also be reacted with maleated polypropylene prior to its reaction with the other polymer components. Thus most preferably, it would be optimal to form the grafted amine-terminated polyether and then mix the alkali metal salt with the grafted amine-terminated polyether, which would then be mixed with the remaining components in the extruder where they would react to form the final conductive blend.

As would be apparent to those skilled in the art of making plastic materials, other additives such as stabilizers are included in polymer blends during processing and for long term photochemical stability. For example, such conventionally added materials may include, but are not limited to antioxidants such as sterically hindered phenols, phosphites, phosphonites, sterically hindered amine light stabilizers, and ultraviolet light absorbers. And, as would be appreciated by those skilled in the art in view of the present disclosure, the addition of internal mold release agents such as metal stearates, fatty and wax acids, amides, or esterified polyol esters and lubricants such as thioesters, low molecular weight olefinic waxes, glycerol monostearate or ethoxylated fatty amines may be used as processing aides.

The table below lists the components of modified plastics made according to embodiments of the present invention as detailed in the examples. It also shows the results of paint adhesion tests on these materials.

|  | Components (Wt %) | | | |
|---|---|---|---|---|
| Example # | 1 | 2 | 3 | 4 |
| Polypropylene (PP) | 64 | 60 | 60 | 75 |
| Maleated PP | 10 | 10 | 12 | 10 |
| Jeffamine | 4 | 6 | 5 | 4 |
| Alkali Metal Salt | | | | |
| LiCl | | 1.2 | | |
| LiCF$_3$SO$_3$ | 2 | | | 1 |
| KCl | | | 1.5 | |
| Ethylene-Butylene Rubber | 20 | 22 | 21.04 | 10 |
| Carbon Black | | | 0.06 | |
| TiO$_2$ | | | 0.50 | |
| Adhesion (% pass) | 100 | 100 | 100 | 95 |
| Conductivity (S/cm) | $10^{-9}$ | $10^{-10}$ | $10^{-11}$ | $10^{-9}$ |

EXAMPLE 1

10 parts of Eastman T43 maleated polypropylene, 4 parts of Jeffamine (amine-terminated polyoxyethylene), and 2 parts lithium trifluoromethanesulfonate are blended in a single screw extruder with a barrel temperature of 190° C. and pelletized. To this reaction product is added 64 parts of polypropylene (Escorene 1042) and 21 parts of ethylene-butylene rubber (Exact 4033). The entire blend is compounded on a twin screw extruder with heater zones controlled at 200–220° C., extruded and pelletized. Samples are then injection molded, painted with a one component basecoat and one or two component clearcoat and cured at 121° C. for 30 minutes. Adhesion was checked via a cross-hatch adhesion test method 72 hours after the paint bake cycle. Volume resistivity measurements were conducted according to ASTM D257-66 resulting in a value of $2.5 \times 10^{-9}$ S/cm.

EXAMPLE 2

1.2 parts of lithium chloride is combined with 6 parts of Jeffamine and mixed above the Jeffamine melting point until dissolved. This mixture is than added to 10 parts of Eastman T43 maleated polypropylene and mixed on a single screw extruder at 190° C. to complete the graft of the polyoxyethylene diamine to the polypropylene chain. This melt product is then fed into a separate twin screw extruder along with 60 parts of polypropylene (Escorene 1105) and 22 parts of ethylene-butylene rubber (Exact 3035) and compounded at 210° C. and pelletized. Samples were painted and tested as in Example 1.

EXAMPLE 3

60 parts of polypropylene (Escorene 1042), 12 parts of Eastman T43 maleated polypropylene, 5 parts of Jeffamine, 1.5 parts of potassium chloride, 21.04 parts of ethylene-butylene rubber (Exact 3022), 0.06 parts of carbon black, and 0.5 parts of titanium oxide were added to a Banbury mixer and blended at 200 rpm for 4 minutes. The resulting blend was passed through a single screw extruder operated at 190° C. and pelletized. Parts were injection molded and painted as in Example 1. The resulting paint adhesion was good and the volume resistivity was measured to be $1 \times 10^{-11}$ S/cm. This material is a mold-in-color grey plastic which is suitable for partially painted applications.

EXAMPLE 4

10 parts of Eastman T43 maleated polypropylene was blended with 4 parts of Jeffamine and 1 part of lithium trifluoromethane sulfonate on a single screw extruder operated at 190° C. and pelletized. These pellets were then blended with 75 parts of polypropylene (Escorene 1105) and 10 parts of ethylene-butylene rubber (Exact 3022) on a twin screw extruder operated at 200° C. and repelletized prior to injection molding. Injection molded plaques tested for volume resistivity and then painted and tested cross-hatch adhesion. 95 percent adhesion was achieved with a volume resistivity of $1 \times 10^{-9}$ S/cm.

These examples may be repeated with similar success by substituting the generically or specifically described reactants and/or reactant conditions recited herein for those actually used in the preceding example.

From the foregoing description, one ordinarily skilled in the art can easily ascertain the essential characteristics of this invention, and without departing from its spirit and scope, can make various changes and modifications in the invention to adapt it to various usages and conditions.

We claim:

1. A thermoplastic olefin polymer blend which has been conductively modified to improve electrostatic painting efficiency, the modified blend comprising a uniform mixture of:

I. polymeric material being the reaction product of:
(a) polypropylene having a number average molecular weight of 30,000–120,000, 40–50% crystallinity, and melt flow rate of 1–70 dg/min.;
(b) maleated polypropylene having a number average molecular weight of 10,000–60,000;
(c) elastomer having a number average molecular weight of 23,000–50,500, 10–50% crystallinity, and melt flow rates of 1.2–9.0 dg/min;
(d) amine-terminated polyether being a linear or branched polymer of oxypropyleneamine or oxyethyleneamine repeating units having 10–100 such units, and II. alkali metal salt, the alkali metal salt being included in said polymer blend in an amount which provides said blend with a conductivity of at least $10^{-12}$ S/cm at 25° C.

2. The modified thermoplastic polymer blend according to claim 1 wherein said alkali metal salt is mixed with said amine-terminated polyether prior to reaction thereof with said other polymer blend materials.

3. The modified thermoplastic polymer blend according to claim 1 wherein said amine-terminated polyether is reacted with said maleated polypropylene (I) prior to reaction with said other polymer blend materials.

4. The modified thermoplastic polymer blend according to claim 2 wherein said amine-terminated polyether is reacted with said maleated polypropylene (I) prior to reaction with said other polymer blend materials.

5. The modified thermoplastic polymer blend according to claim 1 wherein said alkali metal salts are selected from lithium, sodium, and potassium salts.

6. The modified thermoplastic polymer blend according to claim 1 wherein said salts are selected from chlorides, bromides, thiocyanides, hexafluoriphosphates, acetates, and trifluormethane sulfonates.

7. The modified thermoplastic polymer blend according to claim 1 wherein said blend comprises, by weight, 55–75 parts polypropylene, 8–15 parts maleated polypropylene, 2–10 parts amine terminated polyether, and 10–25 parts elastomer.

8. A molded thermoplastic article, having a modified electrical conductivity, adapted for electrostatic painting, being comprised of the modified thermoplastic polymer blend of claim 1.

* * * * *